United States Patent [19]

Seol

[11] Patent Number: 4,574,649
[45] Date of Patent: Mar. 11, 1986

[54] PROPULSION AND SPEED CHANGE MECHANISM FOR LEVER PROPELLED BICYCLES

[75] Inventor: Man T. Seol, Dae Jeon, Rep. of Korea

[73] Assignee: B. D. Yim, Rochester, N.Y.

[21] Appl. No.: 463,085

[22] Filed: Feb. 2, 1983

[30] Foreign Application Priority Data

Oct. 3, 1982 [KR] Rep. of Korea ............... 1982-1880

[51] Int. Cl.[4] ............................................. B62M 1/04
[52] U.S. Cl. ...................................... 74/138; 74/142; 74/833; 192/28; 192/64; 280/251; 280/255
[58] Field of Search ................. 74/833, 138, 141, 142, 74/150, 151; 192/28, 48.92, 64, 42; 280/243, 246, 251, 253, 255, 258

[56] References Cited

U.S. PATENT DOCUMENTS

| | | | |
|---|---|---|---|
| 3,759,543 | 9/1973 | Clark | 280/236 |
| 4,077,648 | 3/1978 | Seul | 280/236 |
| 4,161,328 | 7/1979 | Efros | 280/290 |
| 4,272,096 | 6/1981 | Efros | 280/255 |
| 4,300,784 | 11/1981 | Efros | 280/255 |
| 4,421,334 | 12/1983 | Efros | 280/251 |

FOREIGN PATENT DOCUMENTS

| | | |
|---|---|---|
| 77959 | 11/1894 | Fed. Rep. of Germany . |
| 128003 | 2/1902 | Fed. Rep. of Germany . |
| 192237 | 11/1907 | Fed. Rep. of Germany . |
| 375550 | 7/1907 | France . |
| 578438 | 9/1924 | France . |
| 50-30243 | 3/1975 | Japan . |
| 51-53557 | 12/1976 | Japan . |
| 53-17068 | 5/1978 | Japan . |
| 54-122539 | 9/1979 | Japan . |
| 55-6171 | 1/1980 | Japan . |
| 55-6170 | 1/1980 | Japan . |
| 55-151689 | 11/1980 | Japan . |
| 56-31503 | 7/1981 | Japan . |
| 57-159593 | 10/1982 | Japan . |
| 58-39585 | 3/1983 | Japan . |
| 58-199279 | 11/1983 | Japan . |
| 58-57345 | 12/1983 | Japan . |
| 226383 | 3/1943 | Switzerland . |
| 21570 | of 1898 | United Kingdom . |
| 610936 | 10/1948 | United Kingdom . |
| 667655 | 3/1952 | United Kingdom . |

*Primary Examiner*—Lawrence J. Staab
*Attorney, Agent, or Firm*—M. LuKacher; R. Hallenbeck

[57] ABSTRACT

Propulsion and speed change mechanism for lever propelled bicycles having a pair of propulsion levers 4, each of which is built in one piece with a speed change arm 3 and mounted in each side of the main shaft portion 2 at the bottom of the bicycle frame 1. A rear axle 5 and a hub 6 is mounted on the rear shaft portion 2'. A one-way clutch mechanism has roller-type free wheels 11a installed at both ends of the rear axle. Chains 7", the ends of which may be connected together with a see-saw cable 7', are entrained around gears 7 and guide rollers 13. The free ends of the chains are connected by connecting bars 14 having pins to the speed change arm 3. Pivotally mounted members 15 of triangular shape and a cam bar 17 operated by a speed control knob 18 are used to change the effective length of the arm for speed control.

22 Claims, 11 Drawing Figures

PROPULSION AND SPEED CHANGE MECHANISM FOR LEVER PROPELLED BICYCLES

This invention relates to propulsion and speed change mechanisms for lever propelled bicycles.

The invention is especially suitable for use in a bicycle which is propelled by transmitting force imparted from the up and downward motion of propulsion levers to the rear wheel through a chain and chain gears (also known as sprockets) in which speed change is achieved by changing the position of connecting bars which connect the chain with speed change arms. It will be appreciated that the term bicycle comprehends other vehicles which are adapted to be propelled in a similar manner and which have a different number of wheels, such as tricycles.

Conventional bicycles are mostly driven by circular motion of crank pedals. However, only a small portion of the 360° rotation of the crank is used to propel the bicycle and the rest of the rotary motion is wasted. Therefore, the operator spends more energy and feels tired more readily for the same running conditions. Since the pedal stroke cannot be adjusted and a full turn is inevitably required to drive the conventional bicycle, the rider is not comfortable if his or her physical condition does not fit with the crank pedal's circular motion stroke. Furthermore speed change in a conventional bicycle involves the use of various size chain gears mounted in the same axle which is a complex and heavy structure, demanding higher motion energy. Oftentimes it is necessary to stop and reconnect the chain, since it can be disconnected from the speed change gears while in operation.

Although lever propelled bicycles, propelled by up and downward motion of propulsion levers have been proposed, the mechanisms used for transmitting the motion energy of the propulsion levers to the rear wheel has not been satisfactory. Often a fan-type gear or a rack gear is connected to the propulsion levers and engaged with a pinion which is mounted on the rotary axle of the rear wheel. The bicycle is propelled by repeated forward and backward or up and downward motion of the rack gear or fan-type gear. When the motion is stopped at the top-most and bottom-most position of the propulsion levers, the momentum of the rack or fan gear is transmitted as a shock to the pinion on the rear wheel. Thus, the propulsion is accompanied by repeated, unreasonable shocks and is prone to unreliability. Especially, the latch and pawl of a free wheel in the propulsion mechanism are readily worn out and may break due to the severe repetition of shocking contact and separation. In addition speed change has been achieved by changing the length of a speed change bar. The connecting pin of a connecting bar of the fan-type gear or rack gear which moves the rear wheel is fitted into one of the notches in a row of notches on the speed change bar which is moved up and down on the bar by a speed change wire actuated by pushing a speed control lever up and down. The connecting pin, however, is subject to a substantial burden while in operation which is exacerbated during the pulling motion of the speed control lever. Under this heavy burden, it is very difficult to move the connecting pin by manipulating the small speed control lever by hand. The operator may then have to stop before making a speed change, and speed change while the bicycle is in motion is difficult. The foregoing problems have militated against the practical use of lever propelled bicycles, even though the energy required to propell such a bicycle is much less as compared with conventional bicycles propelled by circular motion of crank pedals.

It is the object of this invention to provide an improved propulsion mechanism as well as an improved speed change mechanism for lever propelled bicycles thereby to increase the usefulness of such bicycles.

In accordance with an embodiment of this invention, two one-way clutches (roller-type free wheels) attached with chain gears are mounted at both ends of the axle of the rear wheel of the bicycle. A chain is entrained around the chain gears. When a pair of chains is used one of the ends of the chain is connected, preferably with a see-saw cable which is supported around a guide roller. The other ends of the chains is connected, preferably with connecting bars having connecting pins, to the speed change arms of a propulsion lever arm assembly. The speed change arms and the propulsion levers are a one piece assembly pivotally mounted for oscillating motion. Each speed change arm is equipped with pivotal members, which may be triangular pieces pivotally fixed thereto. These pivotal members hold the connecting pin of the connecting bar. A control bar, which may have cam projections, can be adjusted by a speed control, and pivots any one of the pivotal members selectively outward of the speed change arm. The connecting pin of the connecting bar from the chain is held by the pivotal member which extends from the speed change arm. Up and downward (oscillatory) movement of the propulsion levers causes the chain to make a see-saw motion. The rear wheel is thus moved forward by the chain gear. Upon adjusting the speed control, any one of the pivotal members of the speed change arm is extended by the control bar from the speed change arm and the connecting pin is automatically caught in a notch on the extended pivotal member. The connection from the chain is therefore made to different positions on the speed change arm. Thus, speed change is obtained readily and even while the bicycle is in operation. At the same time, the flexibility of the chain reduces shock caused by momentum when the up and downward motion of the propulsion levers is stopped at the top-most and bottom-most position thereof. This also avoids unreasonable shocks to the propulsion devices (the clutches and other mechanisms in the rear wheel). Thus, these devices are less likely to fail and wear out. Inasmuch as the bicycle is propelled by the propulsion levers, motion energy of the legs is not wasted and the up and downward motion of the propulsion levers is used fully to propell the bicycle. A feature of the invention is to provide a bicycle which an operator can ride more comfortably and easily for a longer time, as compared with a conventional bicycle.

The foregoing and other objects, features and advantages of the invention as well as a presently preferred embodiment thereof will become more apparent from a reading of the following description in connection with the accompanying drawings in which:

FIG. 3(A) is a side view of the free wheel arrangement;

Figure 1:
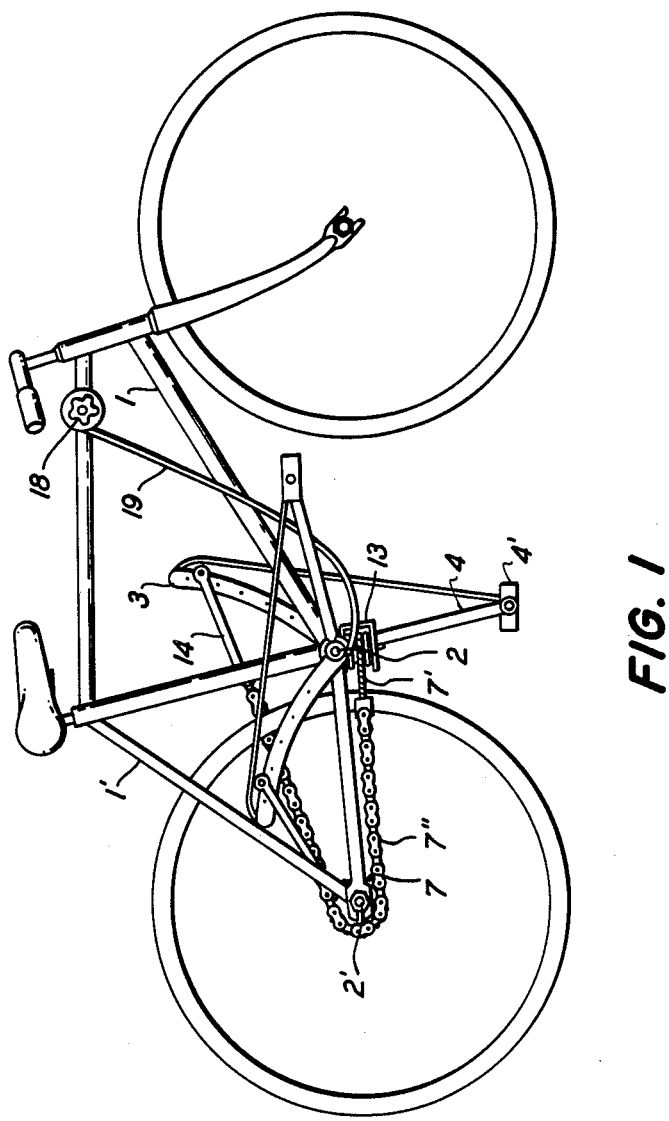
FIG. 1 is a general elevational view of a bicycle equipped in accordance with this invention.
Figure 4:
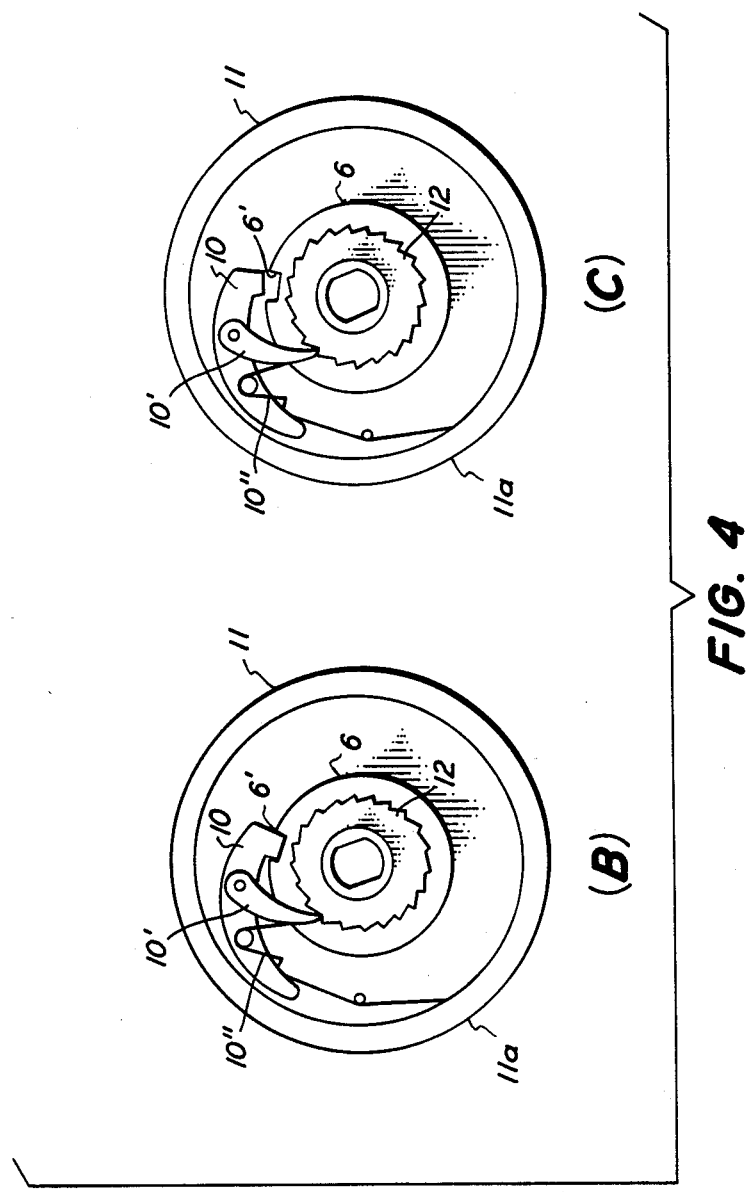
FIG. 4(B) is a side view illustrating the free wheel in forward motion.
FIG. 4(C) is a side view illustrating the free wheel in backward or rearward motion.
Figure 5:
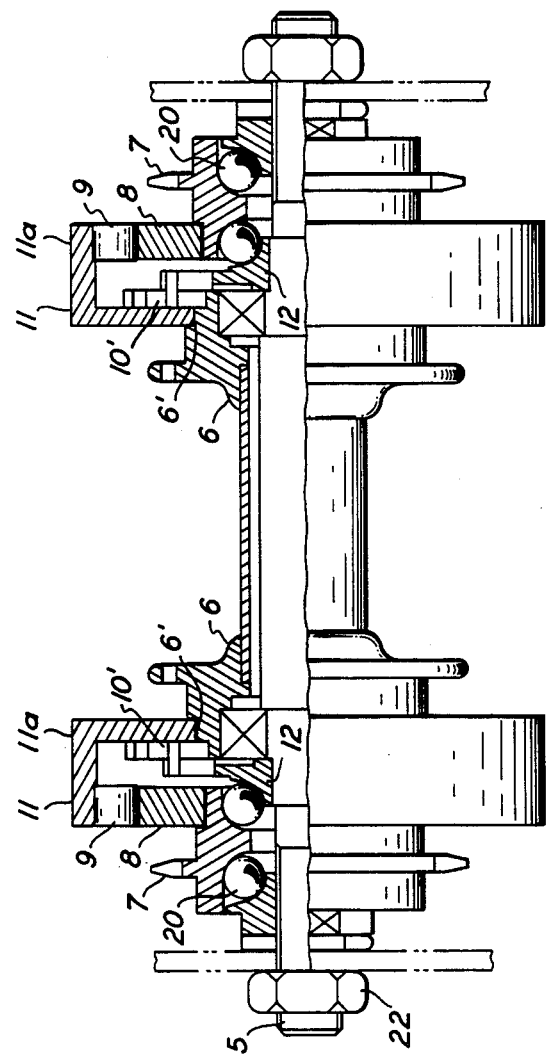
FIG. 5 is a partial sectional view of the rear hub and free wheel assembled together.

Referring more particularly to the drawings, which illustrate a preferred embodiment of the invention, there is shown in FIG. 1 a bicycle comprising propulsion levers 4 and speed change arms 3. These propulsion levers and speed change arms are built in one piece and mounted on the main shaft portion 2 at the bottom of the front frame 1 of the bicycle. The one piece assembly of propulsion levers 4 and speed change arms 3 is pivotally mounted on the shaft 2 in such a manner that the propulsion levers 4 are moveable up and down alternatively (oscillate) by means of pedals 4'. The propulsion levers 4 maintain a certain angle with respect to the speed change arms 3. These arms are slightly curved in an amount dependent upon dimensions of the frame and chains 7" and link 14. Movement of the link will therefore be along the proper locus of curvature. Chains 7" are connected with connecting bars 14 to the speed change arms 3. Guide rollers 13 support a see-saw cable 7' Free wheels 11a of one-way clutch mechanisms with chain gears 7 are mounted on the rear shaft portion 2' at the bottom of the rear frame 1'. The rear wheel assembly at the rear shaft portion 2' is made up of an axle 5 and a hub 6 with a square notch 6' which is cut at the end portion of the hub 6, as shown in the upper right corner of FIG. 3. A cam plate 8 with a plurality of sloped indentations 8', equally distant from each other along the cylindrical surface of the cam plate 8, is provided. The cam plate 8 is attached to the chain gear 7. Each sloped indentation 8' is provided with a hard roller 9 and spring 9'. The cam plate 8 is disposed inside a drum 11 having a latch 10 and pawl 10' which form the shape of the Greek letter, lambda. This assembly of the free wheel 11a is further assembled with a ratchet gear 12. Two such gears 12 are provided at both ends of the axle. The protruding end of the latch 10 fits into the square notch 6' formed on the hub 6 under the bias of a spring 10" (see FIGS. 3 and 4). The pawl 10' is caught by the ratchet gear 12 during backward motion. This causes the latch 10 to separate from the notch 6'. The roller 9 is constricted in the narrow part of the sloped indentation 8' under the inner cylindrical surface of the drum 11 during forward motion of the bicycle. This transmits the power of the chain gear 7 to the hub 6 through the drum 11 (see FIGS. 3, 4 and 5). Several notches 6' may be provided so as to enable more rapid reengagement when forward movement is resumed.

Figure 2:
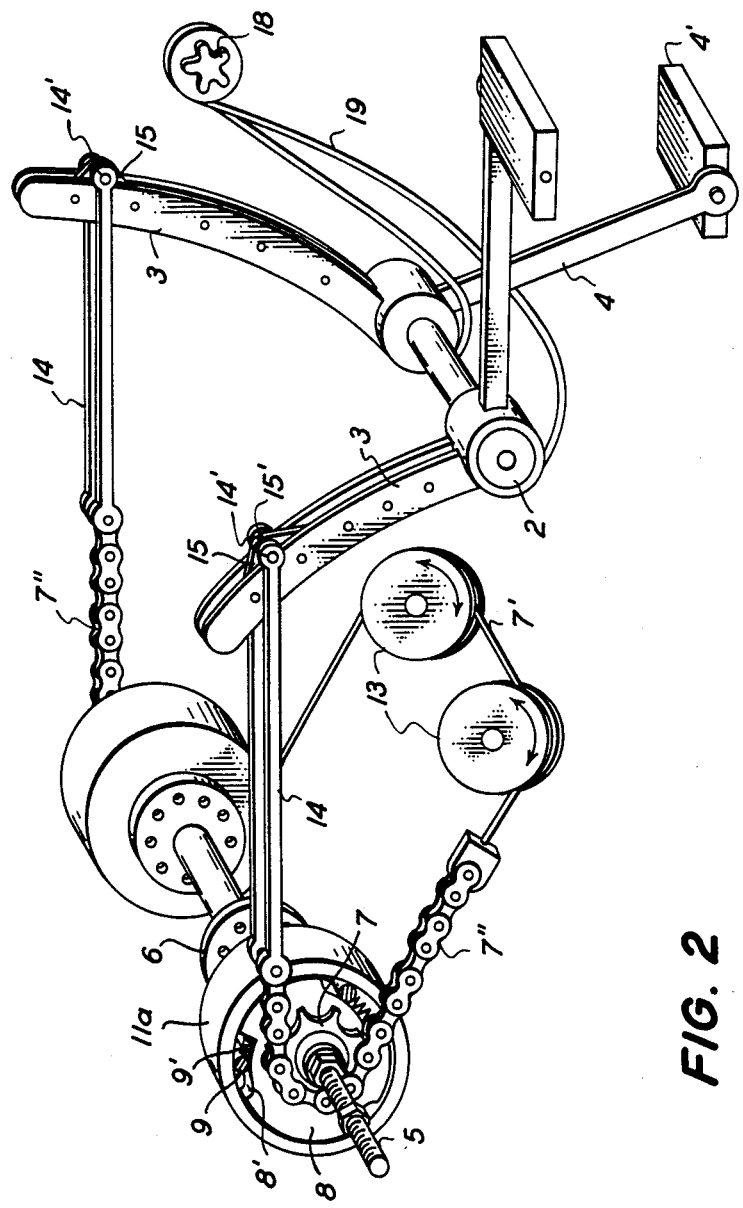
FIG. 2 is a perspective view showing the propulsion and speed change mechanism which is an essential part of the bicycle shown in FIG. 1 and is provided in accordance with the invention.

The chain gears 7 at the ends of the axle 5 have chains 7" entrained thereon. One of the ends of these chains are connected to a see-saw cable 7' which is entrained around guide rollers 13. The other or free ends of the chains are linked with connecting bars 14. Each of the connecting bars is connected to a different speed change arm 3 by means of a connecting pin 14' as shown in FIG. 2.

Figure 6:
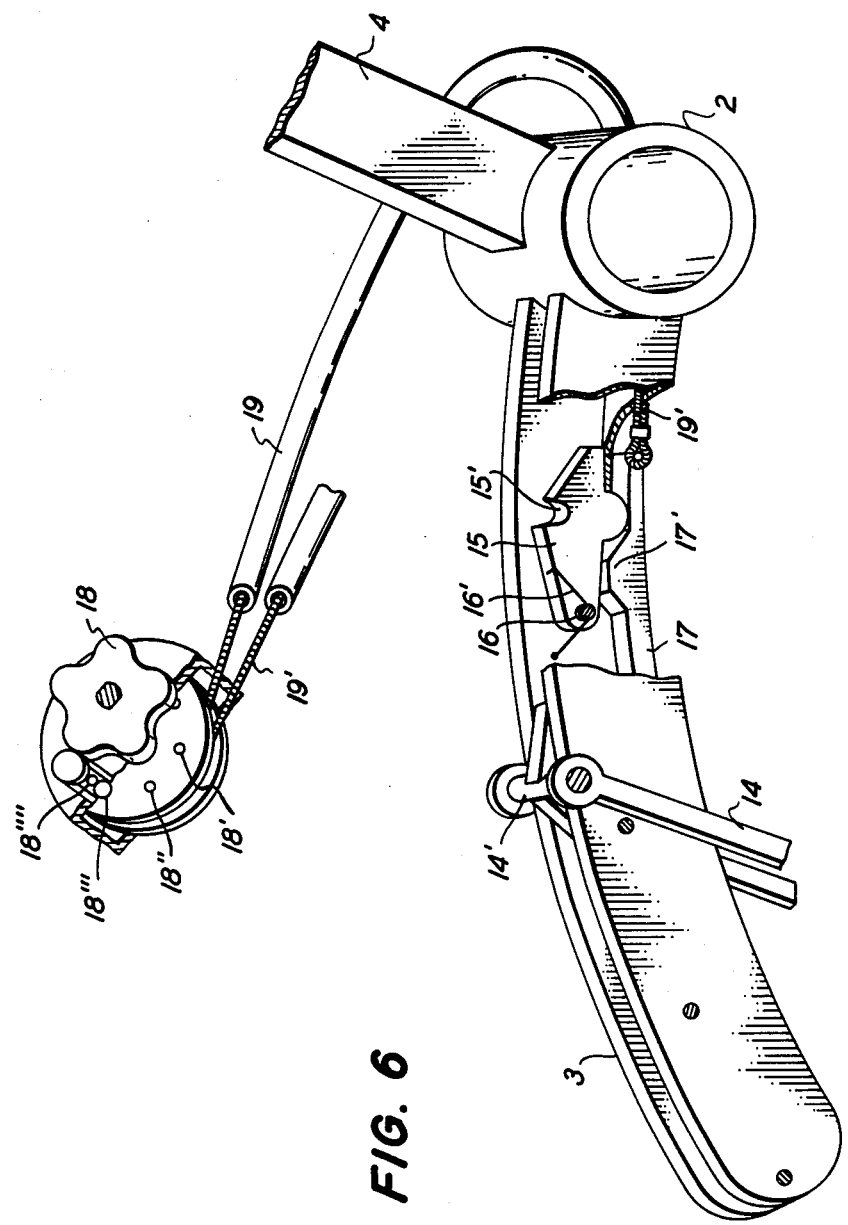
FIG. 6 is a perspective view broken away to illustrate the speed change mechanism provided in accordance with an embodiment of the invention.
Figure 7:
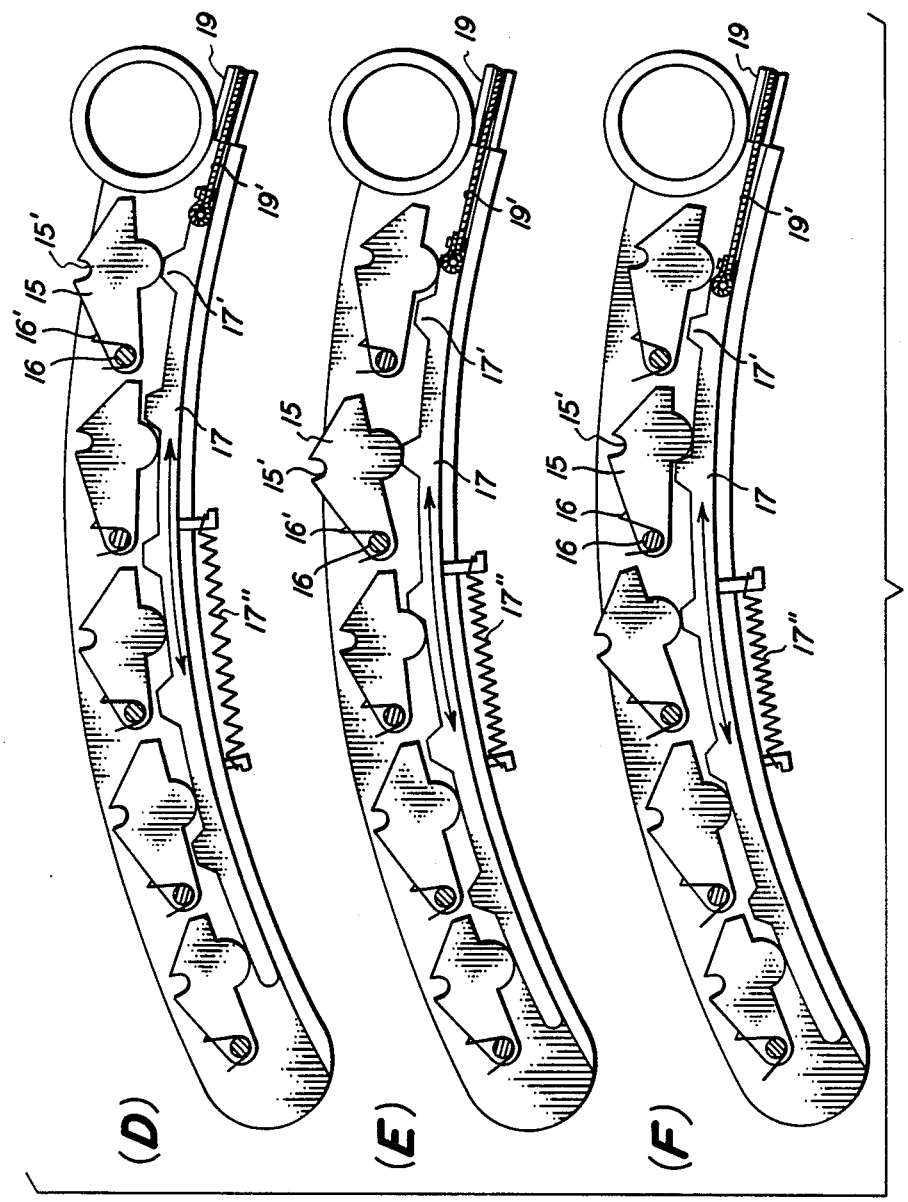
FIGS. 7(D, E and F) are diagramatic views of the speed change mechanism in first speed, second speed, and third speed, respectively.

Each speed change arm 3 is equipped with pivotal members disposed longitudinally therealong in a row. These pivotal members are in the form of triangular pieces 15 mounted at fixed pivots. Each triangular piece has a "U"-shaped notch 15' at the apex of two sides of the triangle thereof. The pivotal connection is made by a supporting pin 16. Springs 16' bias the triangular pieces 15 downwardly toward the bottom of the arms (see FIGS. 6 and 7). A cam bar 17 in each arm is disposed for longitudinal movement in the arm under the triangular pieces 15. The cam bar has the same number of cam projections 17' as the number of pieces 15. The cam bar 17 is positioned and biased by a spring 17". The cam bar 17 is connected to a cable or wire 19' which extends through a conduit 19 to a capstan or wire roller 18'. The capstan 18' is turned by a speed control knob 18. The knob 18 is assembled to a drum which holds a ball 18'" biased by a spring 18''''. The ball is biased against holes 18" and the capstan 18'. By turning the speed control knob 18, the cam bar 17 is moved to the right or left, as viewed in FIGS. 6 and 7. Any one of the pivotal pieces 15 is selectively pushed and extended by a cam 17' on the cam bar 17 out of the edge of the speed change arm 3 on which the connecting pin 14' is moveable. Thus, the connecting pin 14' at the end of the connecting bar 14 is automatically caught into the "U"-shaped notch 15' of the extended piece 15. The speed change is effected by the connection of the connecting bar 14 at different positions on the speed change arm 3.

Figure 3:
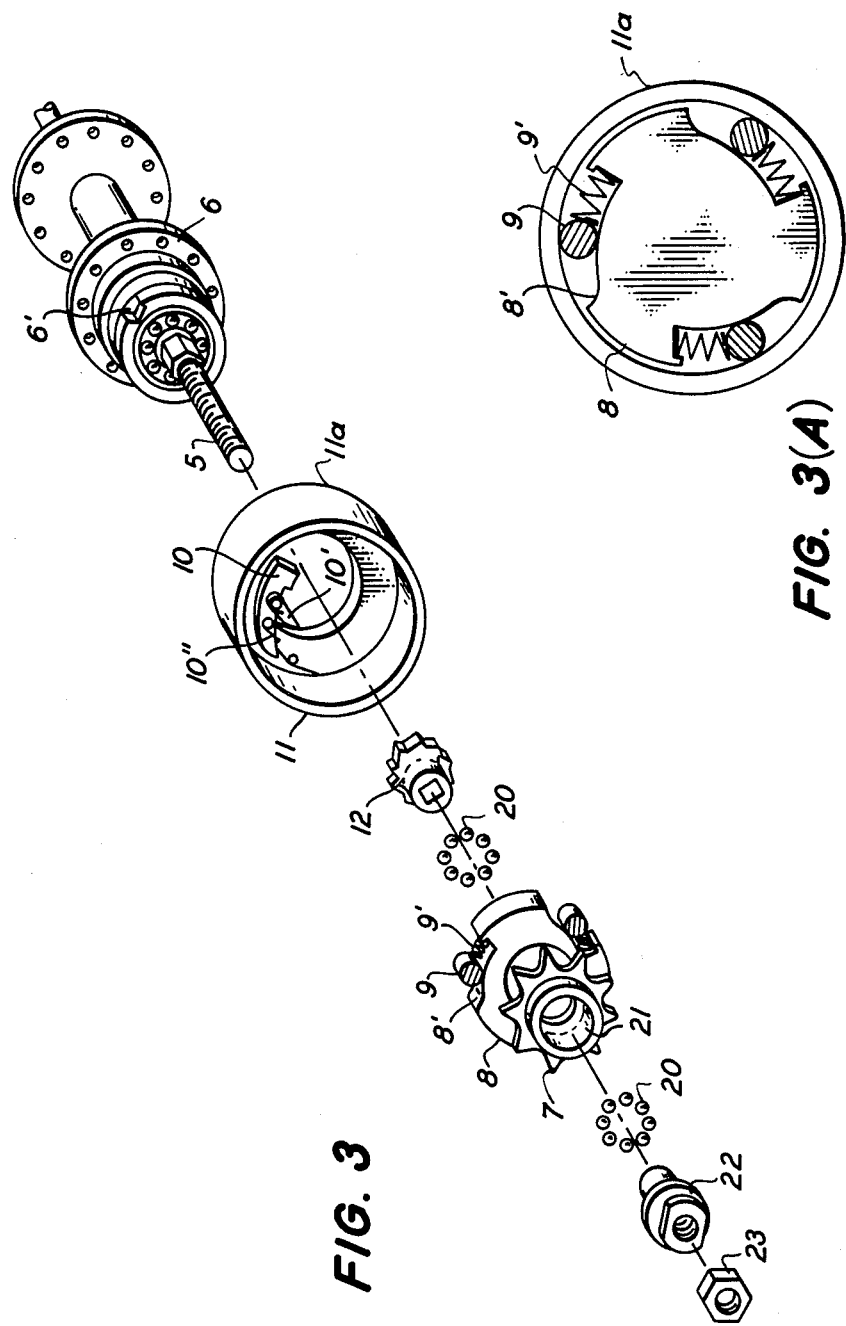
FIG. 3 is an exploded view of the hub and oneway clutch mechanism which contains roller-type free wheels, in accordance with the invention.

In FIG. 3 a set of ball bearings 20 is disposed in a seat 21 and held therein by a bearing race 22 which is assembled to the axle 5 by a nut 23.

To ride the bicycle, an operator sits on the saddle, holds the handle and puts his feet on the right and left pedals 4'. The operator makes repeated up and downward motion (oscillating motion). Then the speed change arms 3 move forward and backward repeatedly according to the angle which they make with the propulsion levers 4. The speed change arms pull on the connecting bars 14 alternatively thereby causing see-saw motion of the chain 7". The chain gears 7 rotate in both directions alternatively. If the chain gear 7 is rotated clockwise, the cam plate also rotates in the same direction. The roller 9 rolls up into the narrow space adjacent the sloped side of the indentation 8' and is caught hard inside of the cylindrical surface of the drum 11 of the free wheel 11a. This constricts the drum 11 and the free wheel 11a is rotated with the chain gear 7. At this time, since the protruding end of the latch 10 in the drum 11 is disposed in the square notch 6' on the hub 6, as shown in FIG. 4(B), and the hub 6 is also rotated in the same direction, causing the bicycle to move forward.

If the chain gear 7 is rotated reversely by the chain 7", or is stationary as during coasting, the roller 9 in the cam plate indentations is rolled down to the wider part of the indentations and separated from the drum 11 of the free wheel 11a. Thus, the reverse rotating motion of the chain gear 7 is not transferred to the drum. The hub 6 is still rotated forward by its rotational momentum without being affected by the reversely rotating chain gear 7. When the chain gear 7 is rotated in the propulsion direction again, the cam plate 8 and the drum 11 are held together and the force is transmitted to the hub 6. Therefore, every time the propulsion levers 4 are moved up and down, the force imparted from their motion is transmitted to the chain gear 7 and the free wheels 11a which are mounted at both ends of the rear axle 5 and the bicycle runs forward continuously.

When speed change is required, the speed control knob 18 is turned and the cam bar 17 is moved to extend the first pivotally mounted piece 15 which is nearest to the shaft 2 from among the plurality of pivot pieces 15 which are disposed in a row in the speed change arm 3 as shown in FIG. 7(D). Thus, the connecting pin 14' of the connecting bar 14 is automatically caught into the "U"-shaped notch 15' on the first piece 15 by the weight of the connecting bar itself and the movements of the speed change arm 3. This results in selecting the lowest or first speed. As shown in FIG. 7(E), the second pivotally mounted piece 15 is extended and the connecting pin 14' of the connecting bar 14 is caught into the second piece 15. Then the somewhat faster, second speed is obtained. If the third piece 15 is extended and the connecting pin 14 is caught into the third piece as shown in FIG. 7(F), a still faster speed, the third speed, is obtained. In this manner the speed change knob is turned and the position of the connecting pin 14' caught on the speed change arm is changed to vary the effective length of the speed change arm, and thus to obtain the desired speed change.

When the bicycle is moved backward and the wheels are rotated in reverse direction, the pawl 10' is caught into one of the teeth of the ratchet gear 12 and pushes up on the latch 10, thereby separating it from the square notch 6' of the hub 6 as shown in FIG. 4(C). Thus, only the hub 6 rotates while the free wheel 11a and the chain gear 7 are free. The bicycle then can run backwards or coast like a conventional bicycle without causing the up and downward movement of the propulsion levers 4.

A bicycle in accordance with the present invention provides the following advantages over conventional, as well as other lever propelled bicycles. Because the bicycle is designed in such a way that the roller type free wheel attached with the chain gear is mounted at both ends of the rear axle, the chains are fitted to the chain gears to provide a see-saw action. The connecting bars connected to the chains are linked to the speed change arms which form a one-piece unit with the propulsion levers. The bicycle is propelled by up and downward motion of the pedals. The angle of this motion can be determined according to the operators physical condition and convenience. Thus, the operator can operate the bicycle with greater comfort and less strain. Also, the force imparted by the up and downward motion of the propulsion levers is fully transmitted to the hub through the chain gears and the free wheels. Thus, energy is not wasted and much less force is required to operate the bicycle. Furthermore, the leg motion to cause the up and downward movement of the propulsion levers is similar to a persons normal walking motion. Therefore, even beginners can easily operate the bicycle in the same manner as walking in place without any special training. Since the flexibility of the chain reduces shock caused by the momentum of the speed change arm when its forward and backward motion is stopped at its foremost and backmost position, unreasonable shocks to the propulsion devices in the rear shaft portion are avoided and smooth power transfer through the roller type free wheels can be achieved. The reliability and life of the propulsion devices is enhanced and much longer operation of the bicycle obtained.

In addition, because many pivotal, triangular pieces are installed in a row on the speed change arm and any one piece is selectably extended out of the arm with the cam bar operated by the speed control knob, the connecting pin located at the end of the connecting bar is caught into the piece which is extended and the desired speed change can readily be obtained even while the bicycle is in operation, depending on the road condition such as uphill and downhill to assure more comfortable and convenient operation of the bicycle.

I claim:

1. A propulsion mechanism for a lever propelled bicycle having a frame with a main shaft portion and a rear shaft portion disposed rearwardly of said main shaft portion on said frame, said mechanism comprising a pair of propulsion levers for receiving pedals, a pair of arms, a journal, said journal, said levers and said arms being a one piece assembly with one of said pair of levers and one of said pair of arms spaced from the other of said pair of levers and the other of said pair of arms, said one piece assemble being pivotally mounted on said main shaft portion, a rear axle attached to said rear shaft portion, a rear wheel hub journaled on said rear axle, a pair of chain gears spaced from each other and journaled on said rear axle, a pair of one-way clutches connecting said chain gears to said rear wheel hub, a chain entrained on said chain gears, and means connecting said chain to said arms to execute see-saw motion as said levers and arms are oscillated upwardly and downwardly by force supplied to said pedals said pair of one-way clutches allowing free counterclockwise rotation of said rear wheel hub, and each one-way clutch comprising a drum having a latch and pawl in the shape of the Greek Letter lambda, a notch in said rear wheel hub for releasably receiving said latch and a free wheel means having a drum engaging element therein disposed inside said drum, said free wheel means being rotatably mounted on said rear axle and being releasably engagable with said rear wheel hub.

2. The propulsion mechanism according to claim 1 wherein each of said free wheel means further comprises a cam plate, one of said free wheel means and one of said chain gears also being attached to each other, said cam plate of each of said free wheel means being disposed internally of said drum thereof and having at least one indentation facing the internal peripheral surface of said drum, said drum engaging element being a roller being disposed in said indentation, a ratchet gear in said drum, said ratchet gear being fixed to said rear axle, said latch pivotally mounted on said drum and pivotal in a direction radially thereof, said notch in said rear wheel hub for releasably receiving said latch, and said pawl in engagement with said ratchet gear, said pawl being pivotally mounted on said latch for pivoting said latch to bring said latch into and out of said notch depending upon the direction of rotation of said rear wheel and rear wheel hub respectively when said bicycle moves in said forward and rearward directions.

3. A propulsion mechanism for a lever propelled bicycle having a frame with a main shaft portion and a rear shaft portion disposed rearwardly of said main shaft portion on said frame, said mechanism comprising a pair of propulsion levers for receiving pedals, a pair of arms, a journal, said journal, said levers and said arms being a one piece assembly with one of said pair of levers and one of said pair of arms spaced from the other of said pair of levers and the other of said pair of arms, said one piece assemble being pivotally mounted on said main shaft portion, a rear axle attached to said rear shaft portion, a rear wheel hub journaled on said rear axle, a pair of chain gears spaced from each other and journaled on said rear axle, a pair of one-way clutches connecting said chain gears to said rear wheel hub, a chain entrained on said chain gears, and means connecting said chain to said arms to execute see-saw motion as said levers and arms are oscillated upwardly and downwardly by force supplied to said pedals wherein said arms are speed change arms each having a longitudinal edge, said means connecting said chain to said arms including links having pins each moveably disposed on the longitudinal edges of said arms, each said arm having a plurality of members pivotly mounted thereon and disposed in spaced relationship longitudinally along said arm, each of said members being pivotally moveable below and above said longitudinal edge of said arm for releasable engagement of said pin therewith, each said arm having a bar moveable longitudinally of said arm, said bar having a plurality of means successively engageable with a different one of said members along the edge thereof opposite to said one edge to define separate cams, said successively engageable means being spaced longitudinally along said bar for successively bringing said members into engagement with said pins for changing the effective length of said arms.

4. The propulsion mechanism according to claim 3 wherein each of said members have a notch along one edge thereof in which said pin is releasably engaged, said successively engagable means being a plurality of projections each of which is engagable with a different one of said members along said opposite edge thereof for successively camming different ones of said members below and above said longitudinal edge to bring said notches into engagement with said pins for changing the effective length of said arms.

5. The propulsion mechanism according to claim 3 further comprising speed control means on said frame and attached to said bars for moving said bars.

6. The propulsion mechanism according to claim 4 wherein said members are generally triangular in shape, having three sides.

7. The propulsion mechanism according to claim 6 wherein said arms have elongated slots therein extending longitudinally thereof, said one edge of said triangular being defined by two of said three sides of said triangular members, said notch being at the apex of said two sides, said opposite edge of said members being the third side of said triangle, said third side facing the bottom of said slot, said bar being disposed between said third side and said bottom, and said members being pivotally mounted near the apex thereof defined by said third side and one of said two sides.

8. The propulsion mechanism according to claim 3 further comprising springs biasing said members into operating engagement with said bar, and spring arms biasing said bars for movement in one direction longitudinally along said arm.

9. The propulsion mechanism according to claim 8 further comprising a speed change knob and cables connecting said knob to said bars to allow movement of said bars longitudinally in one direction under said bias or in an opposite direction against said bias.

10. The propulsion mechanism according to claim 3 wherein said successively engagable means is a plurality of members at least equal in number to said plurality of pivotal members.

11. The propulsion mechanism according to claim 3 wherein each of said arms has said pivotal members disposed inside thereof in a row, said bars also being disposed inside said arms under said members, control cables, speed change means connected to said bars by said control cables whereby upon operating said speed change means selected ones of one said pivotal members are moved out of said arm to raise them above said longitudinal edges of said arms to enable said pin on said link to be caught thereby.

12. A speed change mechanism for a lever propelled bicycle having a pedal lever and a speed change arm mounted about a pivot for oscilating movement, a chain in driving relationship with a wheel of said bycicle, said arm having an edge extending from said pivot longitudinally thereof, said speed change mechanism including link means having a pin moveably disposed on said longitudinal edge of said arm, said arm having a plurality of members pivotly mounted thereon and disposed in spaced relationship longitudinally along said arm, said members being engagable with said pins and being pivotally moveable below and above said edge of said arm for releaseable engagement of said pins therewith, said arm having a bar moveable longitudinally of said arm, said bar having a plurality of means successively engageable with different ones of said members, said successively engagable means being spaced longitudinally along said bar for successively moving different ones of said members below and above said edge of said arm to bring said members into engagement with said pin for changing the effective length of said arm.

13. The invention according to claim 12 wherein each of said pivotal members has a notch along one edge thereof for releaseable engagement of said pins therewithin, said plurality of means successively engagable with different ones of said members being a plurality of projections on said bar, said projections being engagable with said members along the edges thereof opposite to said one edge to define separate cams, said projections being spaced longitudinally along said bar for successively engaging different ones of said members below and above said edge of said arm to bring said notches into engagement with said pin for changing the effective length of said arm.

14. The invention according to claim 12 further comprising speed control means on said frame and attached to said bars for moving said bars.

15. The invention according to claim 13 wherein said members are generally triangular in shape having three sides.

16. The invention according to claim 15 wherein said arms have elongated slots therein extending longitudinally thereof, said one edge of said triangular members being defined by two of said sides of said triangular members, said notch being at the apex of said two sides, said opposite edge of said members being the third side of said triangle, said third side facing the bottom of said slot, said bar being disposed between said third side and said bottom, and said members being pivotally mounted near the apex thereof defined by said third side and one of said two sides.

17. The invention according to claim 16 further comprising springs biasing said members to bring said third sides into engagement with said bar, and spring arms biasing said bars for movement in one direction longitudinally along said arm.

18. The invention according to claim 12 further comprising a speed change knob and cables connecting said knob to said bars to allow movement of said bars longitudinally in one direction under said bias or in an opposite direction against said bias.

19. The invention according to claim 13 wherein said plurality of projections is at least equal in number to said plurality of notched members.

20. The invention according to claim 12 wherein each of said arms has said pivotal members disposed inside thereof in a row, said bars also being disposed inside said arms under said members, control cables, speed change means connected to said bars by said control cables whereby upon operating said speed change means selected ones of one said pivotal members are moved out of said arm to raise said one edges thereof at least in part above said longitudinal of edges of said arms to enable said pin on said link to be caught by said members.

21. In a system having an axle and a hub journaled on said axle, a one-way clutch allowing free counterclockwise rotation of said hub comprising a drum having a latch and pawl in the shape of the Greek Letter lambda, a notch in said hub for releasably receiving said latch and a free wheel means having a drum engaging element therein disposed inside said drum, said free wheel means being rotatably mounted on said axle and being releasably engagable with said hub.

22. The propulsion mechanism according to claim 21 wherein said free wheel means further comprises a cam plate, said cam plate of said free wheel means being disposed internally of said drum thereof and having at least one identation facing the internal peripheral surface of said drum, said drum engaging element being a roller being disposed in said indentation, a ratchet gear in said drum, said ratchet gear being fixed to said axle, said latch pivotally mounted on said drum and pivotal in a direction radially thereof, said notch in said hub for releasably receiving said latch, and said pawl in engagement with said ratchet gear, said pawl being pivotally mounted on said latch for pivoting said latch to bring said latch into and out of said notch depending upon the direction of rotation of said hub when said hub rotates clockwise or counterclockwise.

* * * * *